May 2, 1967
A. H. FITCH
3,317,862
OFF-AXIS ELASTIC WAVE DELAY DEVICE
WITH SPHERICAL REFLECTIONS
Filed Sept. 11, 1964
4 Sheets-Sheet 1
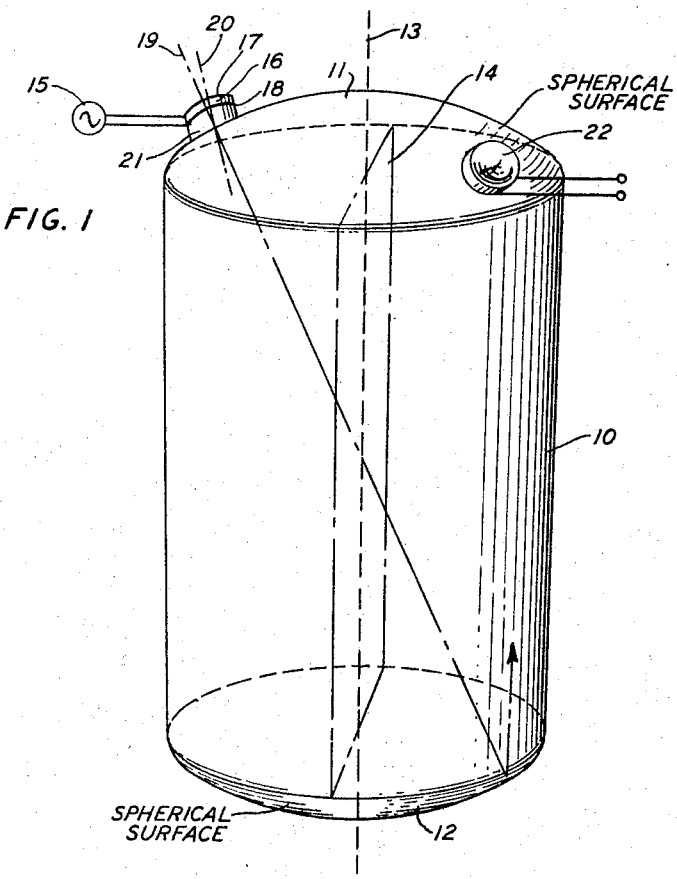
FIG. 1
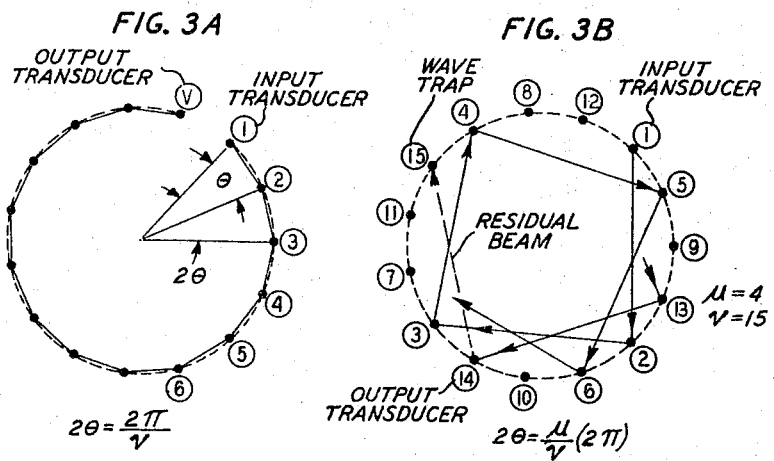
FIG. 3A
$2\theta = \frac{2\pi}{\nu}$
FIG. 3B
$\mu = 4$
$\nu = 15$
$2\theta = \frac{\mu}{\nu}(2\pi)$
INVENTOR
A. H. FITCH
BY Roy M. Porter
ATTORNEY

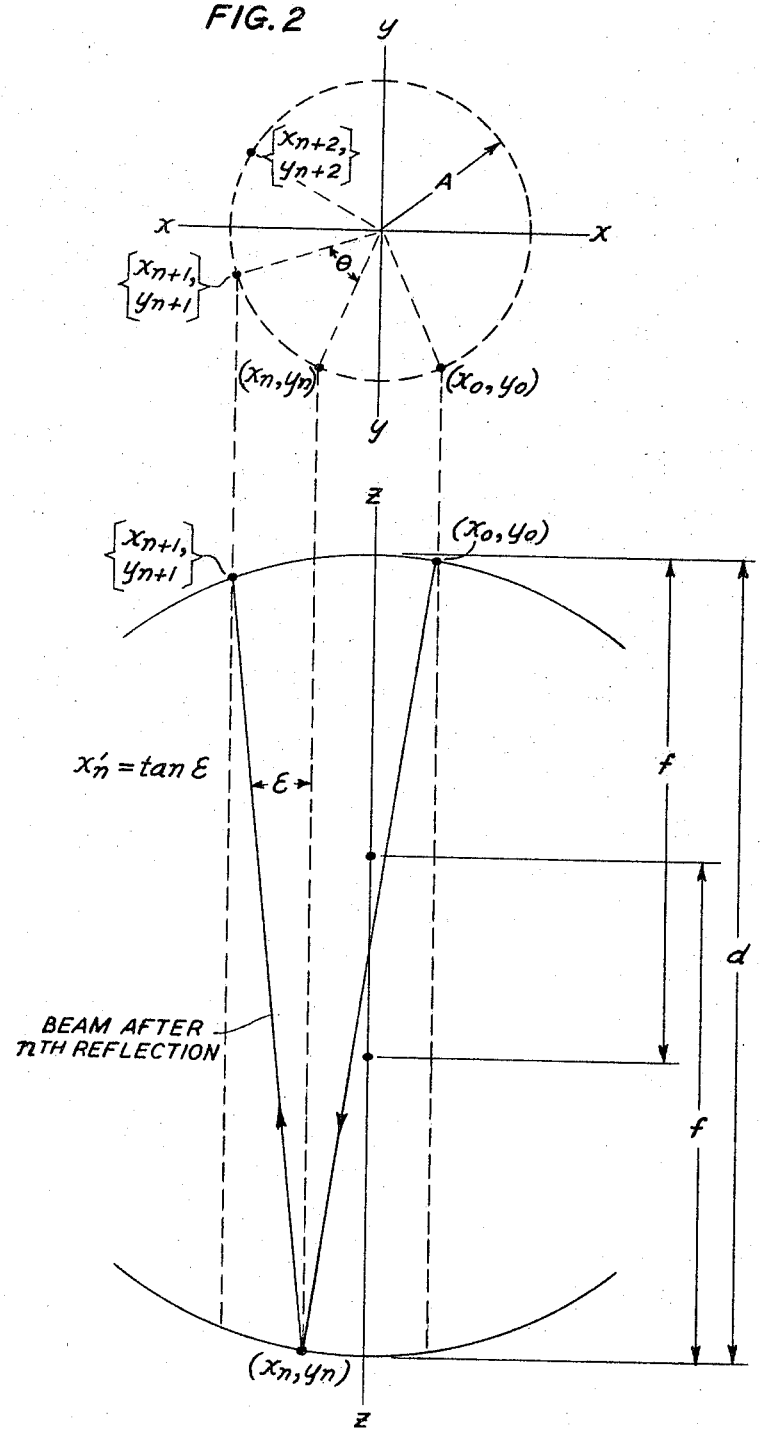

May 2, 1967

A. H. FITCH 3,317,862

OFF-AXIS ELASTIC WAVE DELAY DEVICE WITH SPHERICAL REFLECTIONS

Filed Sept. 11, 1964

United States Patent Office 3,317,862
Patented May 2, 1967

3,317,862
OFF-AXIS ELASTIC WAVE DELAY DEVICE WITH SPHERICAL REFLECTIONS
Arthur H. Fitch, Mountain Lakes, N.J., assignor to Bell Telephone Laboratories, Incorporated, New York, N.Y., a corporation of New York
Filed Sept. 11, 1964, Ser. No. 395,666
11 Claims. (Cl. 333—30)

This invention relates to ultrasonic delay lines and more particularly to delay lines employing multiple reflections of an elastic wave beam within a body of elastic wave propagation material.

Ultrasonic devices such as delay lines take advantage of the fact that the velocity of propagation of an elastic vibration or ultrasonic wave is much lower than that of electrical signals by transforming the electrical signal into an ultrasonic wave, sending the ultrasonic wave down a mechanical path and reconverting the wave into an electrical signal at the far end. The amount of delay in a typical medium is determined by the physical length of the delay path and the velocity of elastic wave propagation therein. Attempts have been made in the prior art to increase this delay time by producing multiple reflections of a directed beam of energy within a given body to increase the effective path length. Delay lines of this type in the prior art are difficult to construct and are apt to produce unwanted signals due to the reflections in the medium that are likely to occur over alternative paths. Furthermore, the beam tends to spread during the course of its extended propagation which allows an undesirable interaction with the boundaries of the medium. In addition, since the output transducer receives only a fraction of a beam which has spread, a substantial portion of the energy is lost.

It is therefore an object of the present invention to improve delay lines employing multiple reflection paths.

It is a more specific object to provide a delay line having a large number of multiple reflection paths which collects and refocuses the energy after each transversal.

In accordance with the invention these objects are accomplished by utilizing an elastic wave transmission medium having a sharp acoustical impedance discontinuity formed according to the curvature of a spherical surface. It has been discovered that a beam of elastic wave energy directed against this discontinuity will be reflected, collected and focused for its travel along a new direction of reflection according to principles applicable to optical spherical reflectors. As a reflecting surface it will have a focal length one-half of its radius of curvature and a focal point between the center of curvature and the discontinuity on the principal axis of the spherical surface and if the beam further recognized that if a second reflecting surface is located in opposing relation to the spherical surface so that the common axis between the surfaces coincides with the principle axis of the spherical surface and if the beam of elastic wave vibration is directed against one of these surfaces along a path that is displaced away from said common axis, the beam will be reflected back and forth along noninterfering paths between the surfaces in a predictable and consistent pattern and at the same time will be repeatedly refocused. In particular, the points of reflection on each of the surfaces will fall along a closed curved pattern, either circular or elliptical, in which the angular spacing between successive points is determined by the ratio of the spacing between the reflectors to the radius of curvature of the spherical surface.

According to a specific embodiment the ends of an elongated cylindrical body of fused silica are shaped as opposing coaxial spherical segments, the spacing between them being different from the sum of their respective effective focal lengths. A spherically shaped piezoelectric transducer is located upon one end to launch an off axis beam of elastic wave energy directed within the body toward the other end. A second transducer is located either at another point on the same end or upon the other end for receiving elastic wave energy after multiple reflections between the ends and for converting the energy into electrical signals.

In other specific embodiments to be described, the principles of the invention are extended to structures in which a single spherical surface is opposed by a plane surface in one example and by a pair of spherical surfaces in another example. Each of these structures has unique properties and advantages that will be pointed out.

Other objects and features, the nature of the present invention and its various advantages, will appear more fully upon consideration of the specific illustrative embodiments shown in the accompanying drawings and described in detail in the following explanation of these drawings, in which:

FIG. 1 is a perspective view of an illustrative embodiment in accordance with the invention;

FIG. 2 is a diagram of coordinate relationships in the embodiment of FIG. 1 and is given for the purpose of explanation;

FIGS. 3A and 3B are diagrammatic representations of reflection patterns of beams on the embodiment of FIG. 1 under respectively different conditions;

Figure 4:
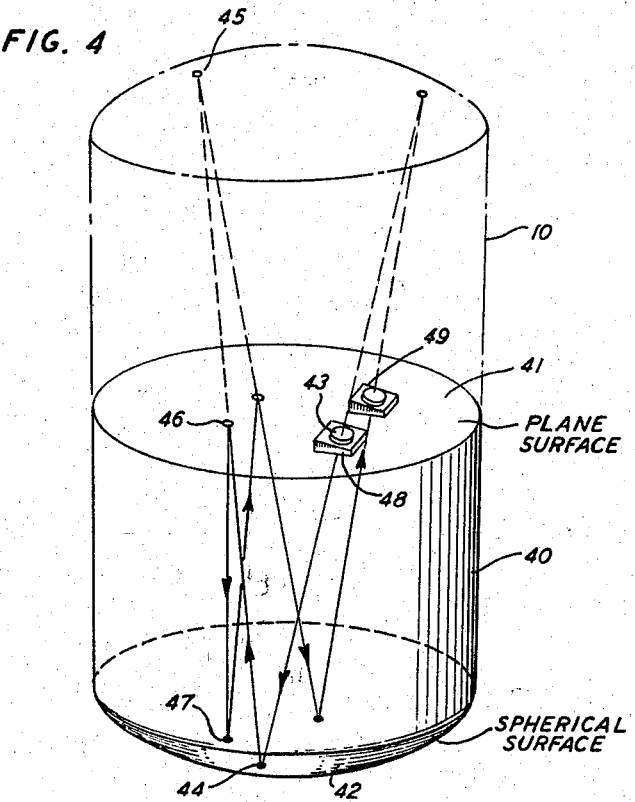
FIG. 4 is a perspective view of an improved embodiment of the invention.

Referring more particularly to FIG. 1, an illustrative embodiment of the invention is shown comprising a cylindrical body 10 formed of any suitable elastic wave transmission material. For example, body 10 may be formed from an isotropic material such as glass or vitreous silica, or from a metal alloy of grain size small compared to the wavelength of the elastic wave to be supported. Body 10 has end surfaces 11 and 12 that are each machined or ground as segments of a sphere. While not necessary, it is preferable from the standpoint of initial design and explanation that each spherical surface have the same radius of curvature and that this radius be greater than the axial spacing between the surfaces. The effective center of each sphere is preferably located upon the common axis between them corresponding to axis 13 of cylinder 10 so that the surfaces form opposing coaxial spherical segments.

Means are provided upon surface 11 at a point removed from cylindrical axis 13 for launching a wave of elastic vibrations along a path within body 10 to be defined hereinafter. Preferably the wave should have a spherical wavefront at surface 11 that corresponds to the curvature of surface 11. While several transducer combinations including magnetostrictive, gyromagnetic and piezoelectric forms are known to the art which would meet these requirements, a preferred combination is illustrated which comprises a voltage source 15, representing the source of the signal to be delayed, applied to an ultrasonic piezoelectric transducer comprising a thin piezoelectric crystal or ceramic member 16 together with its conductive electrodes 17 and 18. This transducer is conventional except for the fact that both surfaces of member 16 have a curvature substantially corresponding to the curvature of surface 11 for the purpose of shaping the wavefront as required. Transducer 16–17–18 is oriented with respect to surface 11 so that the central normal 19 to the spherical curvature of member 16 forms an angle with the normal 20 of surface 11 such that the beam falls upon the opposite cylindrical surface 12. More particularly, normal 19 lies in a plane that is parallel to axis 13 and perpendicular to radial plane 14 of cylinder 10. Normal 19 further intersects plane 14 with a slope of the value to be specified hereinafter. Member 16 is supported and held in this position by a boss or protuberant part 21 either shaped from and formed integrally with surface 11 or separately formed and bonded to surface 11. Thus, when piezoelectric element 16 vibrates in its characteristic mode, a beam of elastic wave energy is directed into body 10 along the direction of axis 19 and impinges upon surface 12 in a confined area which will be referred to hereinafter as a "spot." Surface 12 is characterized by a sharp acoustical impedance discontinuity which substantially completely reflects the elastic wave energy impinging on it. Further, the spherical shape of surface 12 affects the acoustical energy beam exactly as does a spherical mirror with an optical beam: condensing, refocusing and reradiating it along a reflected path toward surface 11 where it forms a second spot. At surface 11 the beam is again refocused and redirected towards surface 12. The delay line is completed by the addition of an output transducer 22, identical to input transducer 16–17–18 which may be located at a point on surface 11 spaced both from the input transducer and from axis 13 as will be described hereinafter, or at any one of similar points on surface 12. Wherever located transducer 22 converts the elastic wave arriving to it after several reflections between surfaces 11 and 12 into electrical energy for delivery to the output.

The specific pattern of reflection and rereflection may be better analyzed with the aid of the graphical presentation of FIG. 2. Thus, two generalized spherical reflectors each having a focal length $f$ (focal length being one-half the radius of curvature R) are spaced apart by a distance $d$ as shown. A beam after the $n$th reflection may be described by the coordinates $x_n$, $y_n$ at the point of its intersection with a reflector and by the slopes $x'_n$ and $y'_n$ for the beam after reflection. The beam as it is injected into the system may be similarly defined by the coordinates $x_0$, $y_0$ and the slopes $x'_0$, $y'_0$. By a straightforward application of the principles of geometry it can be shown that $$x_n = x_0 \cos n\theta + \sqrt{\frac{d}{4f-d}}(x_0 + 2fx'_0) \sin n\theta \quad (1)$$

and that $$\cos \theta = 1 - \frac{d}{2f} \quad (2)$$

where $\theta$ is the polar angle between the point $x_n$, $y_n$ and the next point $x_{n+1}$, $y_{n+1}$. A similar relationship holds for $y_n$.

In a stable reflector system where $$0 < \frac{d}{f} < 4 \quad (3)$$

Equation 1 can be written as $$x_n = A \sin (n\theta + \alpha) \quad (4)$$

where $$\tan \alpha = \sqrt{\frac{4f}{d} - 1} \Big/ \left(1 + 2f\frac{x'_0}{x_0}\right) \quad (5)$$

and $$A^2 = \frac{4f}{4f-d}(x_0^2 + dx_0 x'_0 + df x'^2_0) \quad (6)$$

A is the maximum possible excursion of the beam in the $x$ direction. Similarly, $$y_n = B \sin (n\theta + \beta) \quad (7)$$

From Equations 4 and 7 it can be seen that the intersection of all points $x_n$, $y_n$ with the reflectors when projected onto a single $x$–$y$ plane, lie on an ellipse except where $$A = B \quad (8)$$

and $$\alpha = \beta \pm \frac{\pi}{2} \quad (9)$$

in which case they lie on a circle of radius A.

From Equations 4 and 5 the entrance conditions, that is, those conditions determining the location $x_0$, $y_0$ and entrance slope $x'_0$, $y'_0$ for the beam in order for it to describe a circle may be determined. Calculations may be simplified by selecting the coordinates so that the $y$ axis falls between the entrance location and the first reflection point as shown in FIG. 2 making $y'_0 = 0$. The radial plane passing through the $y$ axis thereby corresponds to the radial plane 14 referred to above in connection with FIG. 1. The coordinates $x_0$ and $y_0$ are determined directly from the desired radius A. Then, $x'_0$ is determined from Equations 4 and 5 as follows:

$$y_0^2 = x_0^2 \left(\frac{4f}{d} - 1\right) \quad (10)$$

$$A^2 = x_0^2 + y_0^2 = \frac{4f}{d} x_0^2 \quad (11)$$

$$x'_0 = -\frac{2x_0}{d} = -\frac{A}{\sqrt{fd}} \quad (12)$$

It is thus seen that an acoustical beam injected into the system of FIG. 1 at the angle specified in Equation 12 will be reflected back and forth between surfaces 11 and 12, the spots on each describing the circle. In FIG. 3A and FIG. 3B all spots occurring on both surfaces are projected onto one end with the odd numbered spots corresponding to those on one surface and the even numbered corresponding to those on the other. The sequence can therefore be described by a single set of polar coordinates. Thus, the angle $\theta$ as defined above by Equation 2 is the angle between spots on opposite surfaces and the angle $2\theta$ is the angle between spots on the same surface. The pattern of FIG. 3A results when $$2\theta = \frac{2\pi}{\nu} \quad (13)$$

where $\nu$ is an integer and represents the number of round trips after which the beam returns exactly to its entrance point. Equation 2 shows that spot separation is determined only by the ratio of $d$ to $f$ so that any number of desired round trips and any desired delay time can be obtained by an appropriate ratio of $d$ to $f$. The maximum delay is limited by the ratio at which adjacent points begin to spill over onto each other which, of course, depends upon the physical size of each spot in terms of the physical radius of the spot circle.

In FIG. 3

$$2\theta = \frac{2\pi\mu}{\nu} \quad (14)$$

where $\mu$ in an integer and represents the number of swings around the spot circle before returning to the entrance spot. The spot sequence specifically illustrated in FIG. 3B is for $\mu = 4$ and $\nu = 15$. In most applications it is desirable to remove the beam from the medium before it becomes re-entrant, that is, before it commences to retrace its path. To this end the output transducer may be located on the spot just preceding the input transducer or upon any spot preceding this as illustrated in FIG. 3A. In certain applications it is desirable to completely remove any residue of the beam before it becomes re-entrant in order to isolate input and output. Thus, at least one and possibly more spots are reserved between the output transducer and the input transducer and are provided with suitable wave traps of which numerous forms are known in the art to absorb and dissipate elastic wave energy at that spot. Such a wave trap is schematically represented on FIG. 3B at spot 15.

While the entrance conditions defined above by Equation 12 are those that produce a circular spot pattern, it should be noted that this relationship is not ordinarily critical and that departure from it will only result in the pattern becoming elliptical. An elliptical pattern will perform satisfactorily in most applications provided that the transducers are located with due regard to new locations of the spots on the elliptical pattern.

A significant simplification of the invention is illustrated in FIG. 4 which is claimed in the copending application of R. Kompfner, Ser. No. 395,664, filed on an even date herewith and is disclosed here for completeness. The advantages of the embodiment of FIG. 4 may be best understood after recalling that in the embodiment of FIG. 1 special precautions were taken to launch an elastic wave having a front corresponding to the spherical curvaturve of the reflecting surface at which the wave entered. This required specially designed transducers which are difficult and expensive to form. With this background it may be seen that the embodiment of FIG. 4 comprises one-half of cylinder 10 of FIG. 1, truncated to form a cylinder 40 having a plane surface 41 as its top and a spherical surface 42 as its bottom. For comparison the outline of cylinder 10 is shown in phantom.

The simplified transducer mounting made possible is readily apparent. Thus, a standard, plane surfaced, piezoelectric transducer 43 is set on the tapered side of wedge 48 made of suitable elastic wave transmission material such as fused silica which in turn is suitably bonded to the flat surface 41 of cylindrical body 40. The direction of the launched wave is determined by rotating the position of the wedge about an axis perpendicular to surface 41 before bonding.

Figure 5:
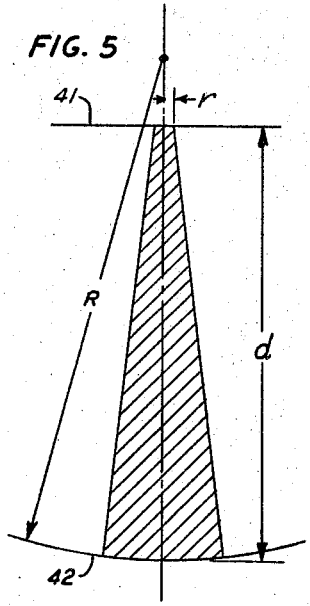
FIG. 5 is a diagram useful for developing relationships for the embodiment of FIG. 4.

The optimum dimensions of transducer 43 are such that the plane wave launched by it at surface 41 spreads into one having a spherical wavefront as it propagates into body 40 toward surface 42, and such that this spherical wavefront has the same curvature as surface 42 when the wave meets the surface. Sufficiently accurate relationships for practical purposes may be seen from FIG. 5. Thus $d$ is the distance between surfaces 41 and 42, the latter having a radius of curvature $R$ which is twice the focal length $f$. It is well known in optics that a spot source of radius $r$ will spread into a spherical wavefront having a radius of curvature $R$ in a distance $d$ according to the relationship:

$$r^4 = \left(\frac{\lambda}{\pi}\right)^2 d(R-d) \quad (15)$$

where $\lambda$ is the wave length of the energy. This optical relationship assumes that the spot source has a Gaussian distribution of energy across its diameter which is probably only approximated in the acoustic energy generated by transducer 43. It is, however sufficient for practical purposes that transducer 43 launch a beam of radius $r$ as defined by Equation 15 at surface 41. The effect is reciprocal, of course, so that the spherical front reflected by surface 42 will become a substantially plane front at surface 41.

Figure 6:
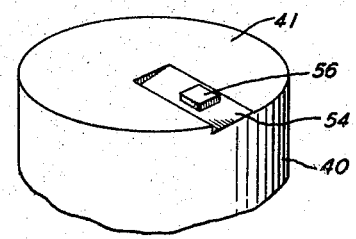
FIG. 6 illustrates an alternative transducer arrangement suitable for the embodiment of FIG. 4.

The resulting spot sequence may be understood by tracing a beam launched by transducer 43 on plane surface 41 directed toward spot 44 of spherical surface 42. Reflections from spot 44 will be directed toward phantom spot 45 in accordance with the criteria developed above in connection with FIGS. 1 and 2 but will actually be intercepted and reflected at spot 46 on plane surface 41 toward a new spot 47, etc. Thus, it is seen that the presence of plane surface 41 in effect doubles the number of multiple reflection paths in the truncated body by producing in it a mirror image of the paths which would have continued into the full body. An output transducer 49 upon a suitably directed wedge and otherwise identical to transducer 43 is located upon the final spot on surface 41. It should be understood that the wedge-transducer combination specifically described represents only a preferred way in which the desired wave may be launched and alternatives will readily occur to those skilled in the art. For example, wedge 48 may be formed integrally with surface 41 from the same material comprising cylinder 40. A further alternative is illustrative on FIG. 6 where the proper entrance angle of the launched beam is provided by the skewed facet 54 cut directly into the flat surface 41 of cylinder 40 upon which transducer 56 is placed.

Figure 7:
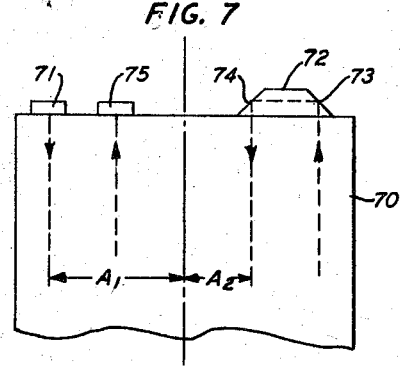
FIG. 7 represents a further improvement by means of which the invention produces greater delay.

In the preceding embodiments the input and output transducers were located at equal distances from the cylindrical axis upon successive spots in a pattern of given radius. A substantial increase in the obtainable delay per unit volume of delay material can be obtained as illustrated in FIG. 7 by transferring the beam to a new radius after it has completed a pattern of a first radius. Thus, cylinder 70 has a diameter sufficient to contain a plurality of spot patterns of different radii. An input transducer 71 launches the beam with an entrance condition defined by Equation 12 for the radius $A_1$. The beam is subsequently captured by a prism 72 of elastic wave transmission material having a facet 73 inclined to deflect the beam toward facet 74. Facet 74 is in turn inclined according to Equation 12 for the radius $A_2$, smaller than $A_1$, to launch a beam which will follow a new pattern of radius $A_2$ within and concentric to the first pattern. Such a beam will eventually be received by output transducer 75 located upon the radius $A_2$. All or part of a large number of concentric patterns may be followed consecutively by employing one or more transferring prisms appropriately located with respect to input and output transducers.

Figure 8:
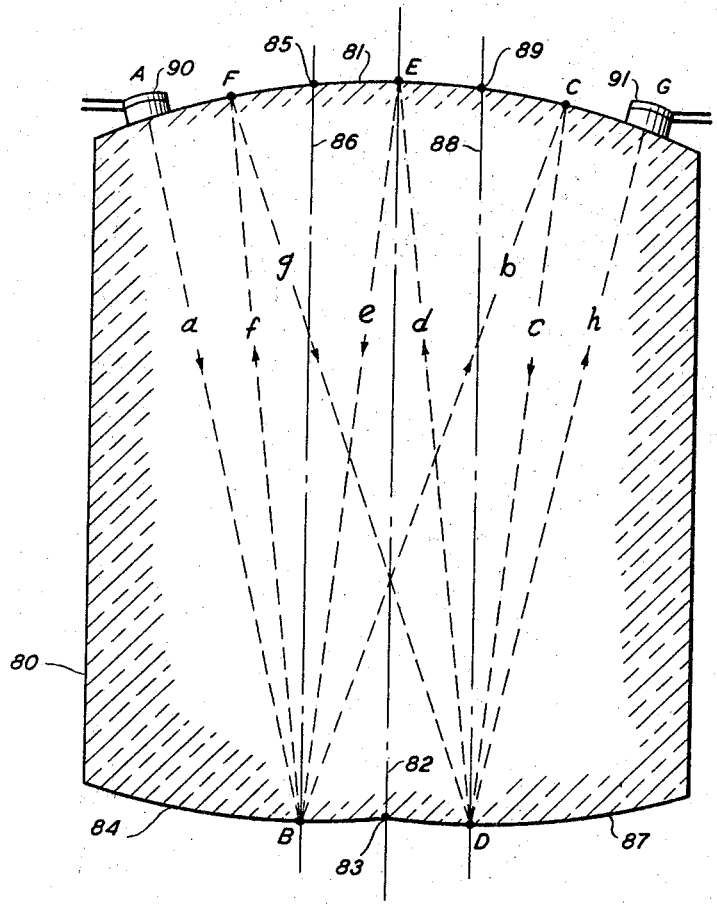
FIG. 8 illustrates by means of a cross-sectional view a final modification of the embodiment of FIG. 1.

FIG. 8 shows a cross-sectional view of a final modification of the embodiment of FIG. 1 in which one of the spherical end surfaces of FIG. 1 is replaced by two adjacent spherical surfaces. Thus, body 80 has a first spherical surface 81 formed with a given radius, a spherical axis 82 and with point 83 as its center of curvature. The other end of body 80 has a complex surface formed with a first spherical portion 84 having the same radius as surface 81, a principal axis 86 parallel to 82, and with its center of curvature at point 85 displaced on surface 81 from the center point thereof. The complex surface further includes a second spherical portion 87 having the same radius, a principal axis 88 parallel to 82 and with its center of curvature at point 89 on the other side of 82 from point 85.

The system described has conjugate foci such that an elastic wave beam leaving any point B on surface 84 is brought to a focus by surface 81 at a spot D on surface 87 and all energy leaving point D on 87 is focused back again as a spot at the original point B on 84. Similarly, all energy leaving any point such as A or F on 81 and going to either B on 84 or D on 87, respectively, is focused back to 81 as new spots C or G, respectively. Consistent with the well-known rule of reflection, pairs of spots A and C or F and G lie on a straight line whose center falls on the respective centers of curvature.

An input transducer 90 along with its aligning wedge as used in FIG. 1 is located near the edge of surface 81 at point A. Thus, successive multiply-reflected rays $a$ through $h$ may be traced between points A through G. An output transducer 91 at point G will receive the finally reflected ray $h$. The number of paths may be increased by reducing the distance between the axes 82, 86 and 88 relative to the radii of curvature. It is thus seen that the embodiment of FIG. 8 has all of the advantages, including focusing, of the embodiments described above with the added advantage that all spots lie along a straight line. Thus, the thickness of body 80 normal to the plane of the cross-section shown may be small. This means that body 80 may in effect be a flat plate and that surfaces 81, 84 and 87 may be allowed to approach ones of cylindrical curvature.

While the principles of the invention have been illustrated in terms of its application to delay line devices, it should be understood that the invention is useful in any application where multiple passes of an elastic wave are desired. In particular, it may be used in order to increase the interaction between an elastic wave and energy in some other form, as for example, in an optical modulator of the type disclosed in the copending application of P. K. Tien Ser. No. 108,787, filed May 9, 1961, now U. S. Patent 3,174,044, granted Mar. 16, 1965, or in an elastic wave amplifier of the type disclosed by D. L. White in application Ser. No. 105,700, filed Apr. 26, 1961, now U.S. Patent 3,173,100, granted Mar. 9, 1965.

In all cases it is to be understood that the above-described arrangements are merely illustrative of a small number of the many possible applications of the principles of the invention. Numerous and varied other arrangements in accordance with these principles may readily be devised by those skilled in the art without departing from the spirit and scope of the invention.

What is claimed is:

1. An ultrasonic device comprising first and second spaced acoustical reflectors disposed along a common axis, at least one of said reflectors having a spherical reflecting surface having a given focal length, means associated with said first reflector for directing a beam of elastic wave energy toward said second reflector along a path displaced away from said common axis, and means for receiving elastic wave energy after multiple reflections between said reflectors.

2. The delay device of claim 1, wherein both of said reflectors have spherical reflecting surfaces each having a focal length and are spaced apart by a distance that is less than the sum of said focal lengths.

3. The delay device according to claim 1, wherein said surfaces are spaced apart by a distance $d$, and wherein said transducers are removed from each other by an integral multiple of a polar angle $\theta$ about said axis where $\theta$ is the angle whose cosine is $$1 - \frac{d}{2f}$$

in which $f$ is said focal length.

4. The delay device according to claim 1, wherein said path lies in a plane parallel to said axis and makes an acute angle with a radial plane through said axis.

5. The delay device according to claim 4, wherein said path has a slope with respect to said radical plane of $$A/\sqrt{fd}$$

where $d$ is the distance between said surfaces, $f$ is said focal length and $A$ is the radial displacement away from said common axis.

6. The delay device according to claim 1, including means at a point where said multiply-reflected energy impinges on one of said surfaces for absorbing and dissipating said energy.

7. The delay device according to claim 1, including means at a point where said multiply reflected energy impinges on one of said surfaces for transferring said energy to a different displacement away from said common axis.

8. An ultrasonic wave transmission system comprising first and second spaced acoustical reflectors at least one of which has a spherical reflecting surface having a principal spherical axis, an elastic wave energy transmission medium disposed between said reflectors, a first transducer means associated with said first reflector for converting an electrical signal into elastic wave energy directed toward said second reflector in a beam displaced away from said principal axis, and a second transducer means removed from said first transducer for receiving elastic wave energy after multiple reflections between said reflectors and for converting said received energy into electrical signals.

9. The system according to claim 8, wherein the other of said reeflctors is a spherical reflecting surface having a spherical axis in common with said principal axis.

10. The system according to claim 8, wherein the other of said reflectors comprises a pair of adjacent spherical reflecting surfaces having spherical axes parallel to and displaced from said principal axis.

11. An ultrasonic delay line comprising a solid body of isotropic material having first and second spaced spherically shaped ends symmetrical with an axis of said body, a first transducer means associated with said first end for converting an electrical signal into a beam of elastic wave energy directed toward said second end along a path displaced away from said axis and a second transducer means removed from said first transducer means for receiving elastic wave energy after multiple reflections between said ends and for converting said received energy into electrical signals.

References Cited by the Examiner
UNITED STATES PATENTS

| 2,503,831 | 4/1950 | Mason | 333—30 |
| 2,753,528 | 7/1956 | Ashby | 333—30 |
| 3,122,665 | 2/1964 | Bailey | 333—30 |
| 3,158,819 | 11/1964 | Tien | 330—5 |

References Cited by the Applicant
UNITED STATES PATENTS

| 2,558,012 | 6/1951 | Starr. |
| 2,685,067 | 7/1954 | Beveridge. |
| 2,753,528 | 7/1956 | Ashby. |

ROY LAKE, *Primary Examiner.*

DARWIN R. HOSTETTER, *Examiner.*